United States Patent [19]

Kanda et al.

[11] Patent Number: 4,844,083
[45] Date of Patent: Jul. 4, 1989

[54] ULTRASONIC IMAGING APPARATUS

[75] Inventors: Ryoichi Kanda; Takeshi Sato, both of Ootawara, Japan

[73] Assignee: Kabushiki Kaisha Toshiba, Kawasaki, Japan

[21] Appl. No.: 911,332

[22] Filed: Sep. 25, 1986

[30] Foreign Application Priority Data

Sep. 26, 1985 [JP] Japan .................................. 60-213345
Sep. 30, 1985 [JP] Japan .................................. 60-214945

[51] Int. Cl.$^4$ .............................................. A61B 8/00
[52] U.S. Cl. .................................. 128/661.01; 358/112
[58] Field of Search ........................ 358/112; 128/660; 364/577; 73/720, 725, 606, 607; 367/11; 342/185

[56] References Cited

U.S. PATENT DOCUMENTS

| | | | |
|---|---|---|---|
| 4,245,250 | 1/1981 | Tiemann | 342/185 |
| 4,310,907 | 1/1982 | Tachita et al. | 367/11 |
| 4,471,449 | 9/1984 | Leavitt et al. | 358/112 |
| 4,549,210 | 10/1985 | Dulapa | 358/112 |

OTHER PUBLICATIONS

Digital Scan Converters in Diagnostic Ultrasound Imaging, Ophir & Maklad, Proceedings of IEEE, Apr. 1979.

Primary Examiner—Francis Jaworski
Assistant Examiner—George Manuel
Attorney, Agent, or Firm—Finnegan, Henderson, Farabow, Garrett and Dunner

[57] ABSTRACT

An ultrasonic imaging apparatus having an ultrasonic transducer for applying an ultrasonic beam to a subject, thereby to perform sector scanning. Echo waves are obtained by the sector scanning. The transducer converts the echo waves into echo signals. Echo signals are sampled at intervals shorter than the pitch of pixels. The data sampled along each scanning line is stored as pixel data in a frame memory comprising a number of memory elements. In this case, the data sampled at the points of the adjacent scanning lines, which are equidistant from a beam-emitting point, are used for obtaining interpolation data to be stored in the memory elements between the adjacent scanning lines.

9 Claims, 9 Drawing Sheets

F I G. 4B
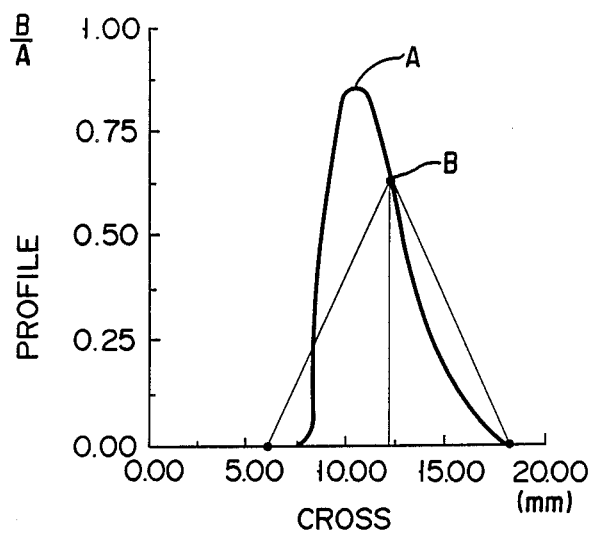
F I G. 4C
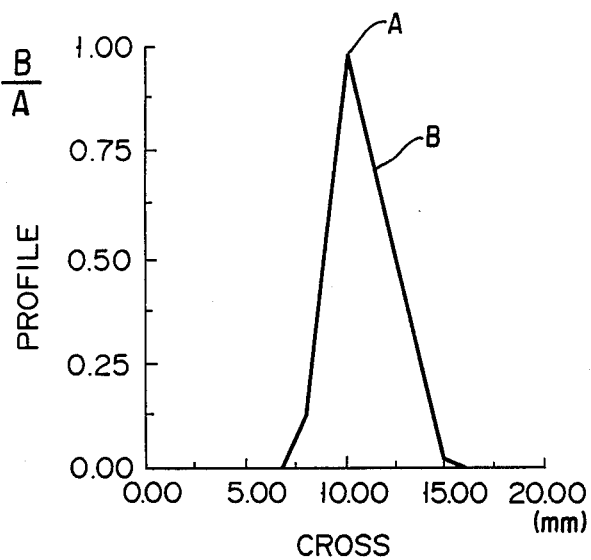

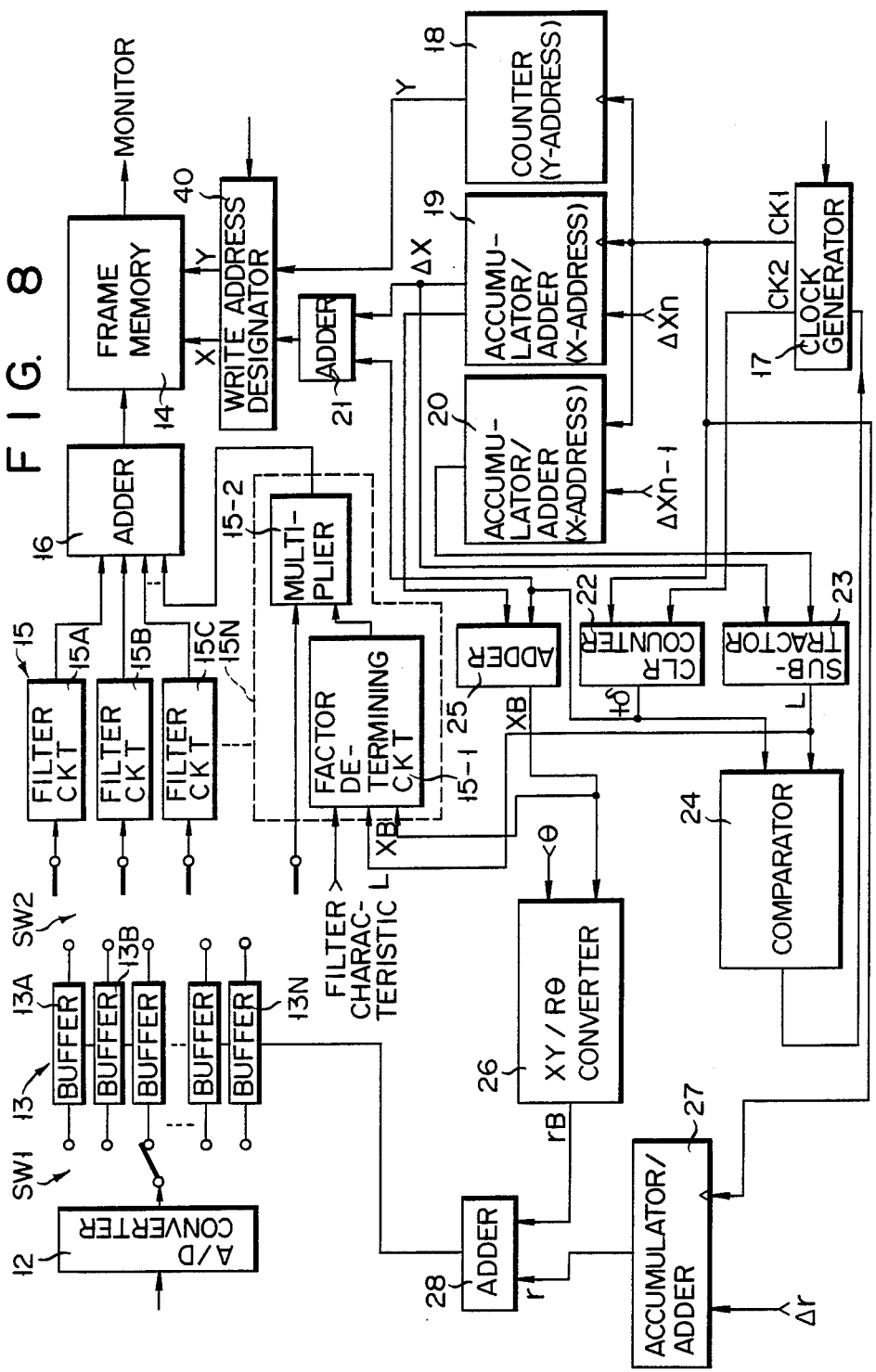

ULTRASONIC IMAGING APPARATUS

BACKGROUND OF THE INVENTION

This invention relates to an ultrasonic imaging apparatus for forming a tomogram of a subject by applying ultrasonic waves to the subject and processing echo waves reflected from the subject.

An ultrasonic imaging apparatus is used in an ultrasonic diagnosis apparatus which applies ultrasonic waves to a patient, converts echo waves coming from the patient into electrical signals, processes the signals into image signals, and displays a tomogram on a CRT monitor, thereby helping doctors to make a diagnosis. The imaging apparatus has an ultrasonic transducer, an A/D converter, a buffer memory and a frame memory. The transducer is brought into contact with the patient's body, and applies an ultrasonic beam to the region of interest, thereby performing sector scanning on the region of interest. The sector scanning is achieved by ultrasonic steering of the beam. The transducer converts the echo waves obtained by the ultrasonic steering into echo signals. The A/D converter converts the echo signals to digital image signals. The image signals are stored in the buffer memory. The image signals, or image data, is transferred to the frame memory. The data is read from the frame memory and is converted to analog data by a D/A converter. The analog data is supplied to a CRT monitor, which displays a tomogram of the region of interest.

The conventional ultrasonic imaging apparatus samples the image signal one pixel after another, in the direction of the depth from the surface of the patient's body. Each sampled pixel signal is stored in the corresponding memory element of the frame memory. When the pixel data is stored in any memory element other than the corresponding one (for example, when black image data is stored in the memory element to store white image data), the frame image (i.e., tomogram) stored in the frame memory is displaced from the original tomographic image in the depth direction. In the known apparatus, the image data is interpolated but only in the horizontal direction. Hence, a phenomemon called "areasing" inevitably occurs, and the image data obtained by this horizontal data-interpolation results in a stepwise distortion of the tomogram.

SUMMARY OF THE INVENTION

The object of the present invention is to provide an ultrasonic imaging apparatus which can store sampled pixel signals in the correct memory elements of a frame memory, without causing a stepwise distortion of the tomogram.

According to the invention, echo signals from a subject are sampled at a sampling interval much shorter than the pitch of pixels. The signals sampled for each scanning line are converted to digital signals. These digital signals are stored in the memory elements of the frame memory which are provided for the scanning line, thus forming image data. The image data is interpolated, and the interpolation data is stored in the memory elements of the frame memory which exist between any adjacent two scanning lines. More precisely, the two pieces of image data corresponding to two adjacent scanning lines and obtained from those two points within the subject which are equidistant from an ultrasonic wave-emitting point are used for interpolation in a slantwise direction.

BRIEF DESCRIPTION OF THE DRAWINGS

FIGS. 4A to 4C illustrate the profiles of three sound fields generated by applying an ultrasonic beam in different directions to a subject;

FIG. 8 is a block diagram of an ultrasonic imaging apparatus according to another embodiment of this invention;

DETAILED DESCRIPTION OF THE PREFERRED EMBODIMENTS

Figure 1:
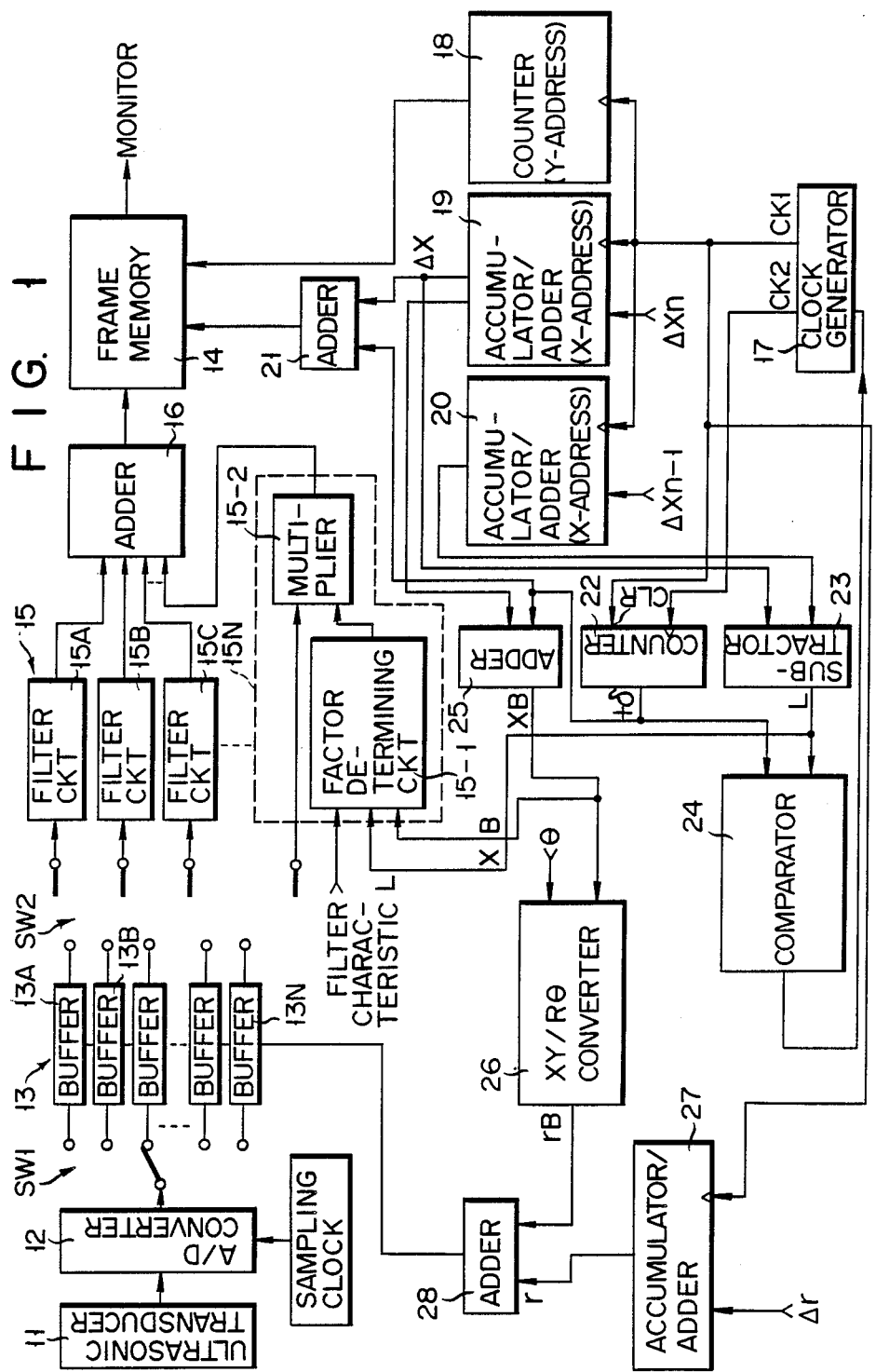
FIG. 1 is a block diagram of an ultrasonic imaging apparatus according to one embodiment of this invention.

FIG. 1 shows an ultrasonic imaging apparatus according to one embodiment of the invention. As shown in FIG. 1, the apparatus comprises ultrasonic transducer 11, the output of transducer 11 is coupled to A/D converter 12 for converting echo signals to digital signals. The output of A/D converter 12 is connected by switch SW1 to high-speed buffer memories 13A to 13N of buffer memory section 13, to one buffer memory at a time. Memories 13A to 13N are provided for different scanning lines, and each is used to store image data obtained by steering a subject along the associated scanning line.

The outputs of high-speed buffer memories 13A to 13N are connected by digital switch SW2 to filter circuits 15A to 15N of filter section 15. Filter circuits 15A to 15N each comprises factor-determining circuit 15-1 and multiplier 15-2. The outputs of circuits 15A to 15N are connected to adder 16, the output of which in turn is coupled to frame memory 14.

The apparatus further comprises clock generator 17 for generating reference clock pulses CK1 and CK2. The CK1-output of clock generator 17 is coupled to Y-address counter 18, X-address (n) accumulator/adder 19, and X-address (n-1) accumulator/adder 20. It is also coupled to the first input of +1 counter 22. Counter 18 counts clock pulses CK1 thereby to designate that Y-address of frame memory 14 which corresponds to a column of pixels. Accumulator/adder 19 specifies that X-address of frame memory 14 which corresponds to one (BMn) of two adjacent ultrasonic beams. Accumulator/adder 20 specifies that X-address of frame memory 14 which corresponds to the other (BMn-1) of the adjacent beams. The CK2-output of clock generator 17 is connected to the second input of +1 counter 22.

The output of Y-address counter 18 is coupled to frame memory 14. X-address (n) accumulator/adder 19 has two output terminals, and X-address (n-1) accumulator/adder 20 has one output terminals. The first output of accumulator/adder 19 is connected to the first input of adder 21 and also to the first input of subtractor 23. The second output of accumulator/adder 19 is coupled to adder 25. The output of accumulator/adder 20 is coupled to the second input of subtractor 23.

The output of counter 22 is connected to the second input of adder 21 and to the second input of adder 25. It is also coupled to the first input of two-input comparator 24. The output of subtractor 23 is connected to the second input of comparator 24 and to factor-determining circuit 15-1 of every filter circuit of section 15. The output of comparator 24 is connected to clock generator 17.

The output of adder 25 is connected to factor-determining circuit 15-1 of every filter circuit and to the first input of two-input XY-R$\theta$ converter 26. Angle data $\theta$ is supplied to the second input of XY-R$\theta$ converter 26. The output of XY-R$\theta$ converter 26 is coupled to two-input adder 28. The second input of adder 28 is connected to the output of accumulator/adder 27 for selecting the addresses of high-speed buffer memories 13A to 13N. The inputs of accumulator/adder 27 are connected to the CK2-output of clock generator 17 and also to a $\Delta r$ output circuit (not shown). The output of adder 28 is coupled to the timing terminals of high-speed buffer memories 13A to 13N.

The fundamental features of the present invention will be explained before the operation of the first embodiment described above.

Figure 2:
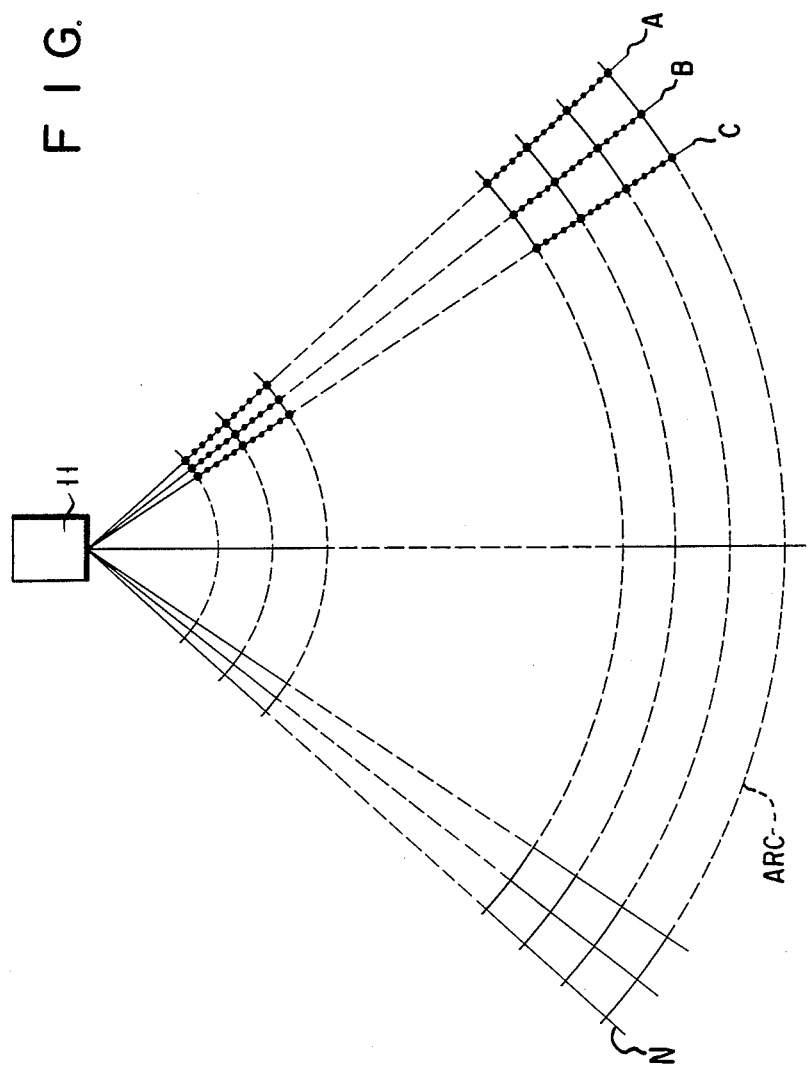
FIG. 2 is a diagram explaining how sector scanning is performed.

FIG. 2 shows sector scanning lines. An echo signal obtained by emitting an ultrasonic beam along each scanning line is sampled at intervals shorter than the pitch of pixels, for example, about one-tenth the pitch. In other words, the echo signal is finely sampled along the scanning line. This fine sampling prevents a displacement of the pixel data in the depth direction of the subject. This is because the sampled data, which is closest to the center of the target pixel, can be easily picked as the pixel data to be stored.

In the present invention, the area between any adjacent two scanning lines is interpolated by the echo signals sampled at equidistant points from the point where the ultrasonic beam is emitted to the subject. In other words, the data sampled along an arc whose center is the beam-emitting point is used to achieve the interpolation.

Figure 3:
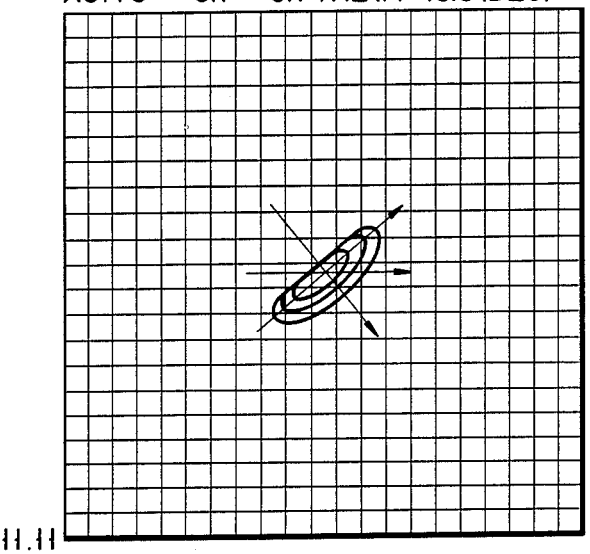
FIG. 3 shows a sound field of ultrasonic waves.
Figure 4A:
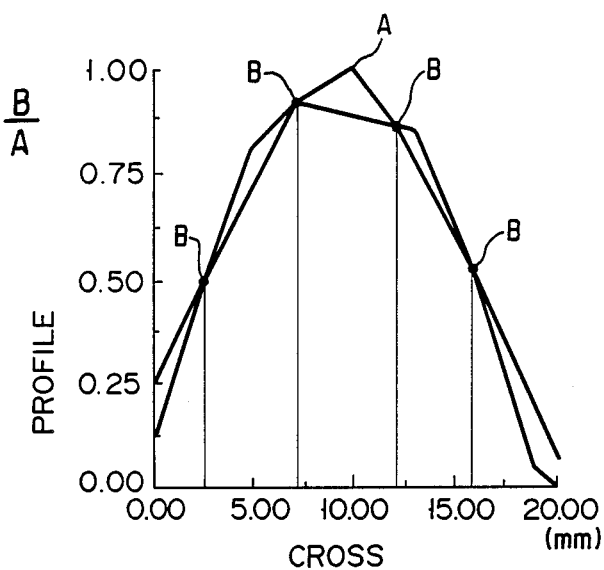

When ultrasonic transducer 11 applies an ultrasonic beam at 40° to a subject, the sound field shown in FIG. 3 will be generated. This sound field has the profile of FIG. 4A with respect to the line extending at right angles to the ultrasonic beam. As shown in FIGS. 4B and 4C, the profile of the sound field is steep with respect to the horizontal direction and also to the ultrasonic beam. In contrast, as shown in FIG. 4A, the profile is considerably gentle with respect to the line extending at right angles to the ultrasonic beam. When the echo signals are sampled along a steep profile of the sound field, the number of sampling points is inevitably small, and the effective component of each echo signal will be wasted. When the echo signals are sampled along a gentle profile of the sound field, the number of sampling points is large, and correct sampled data can be obtained. Hence, in the present invention, the data sampled along the gentle profile shown in FIG. 4A is used to interpolate the area between any adjacent two scanning lines.

Figure 5:
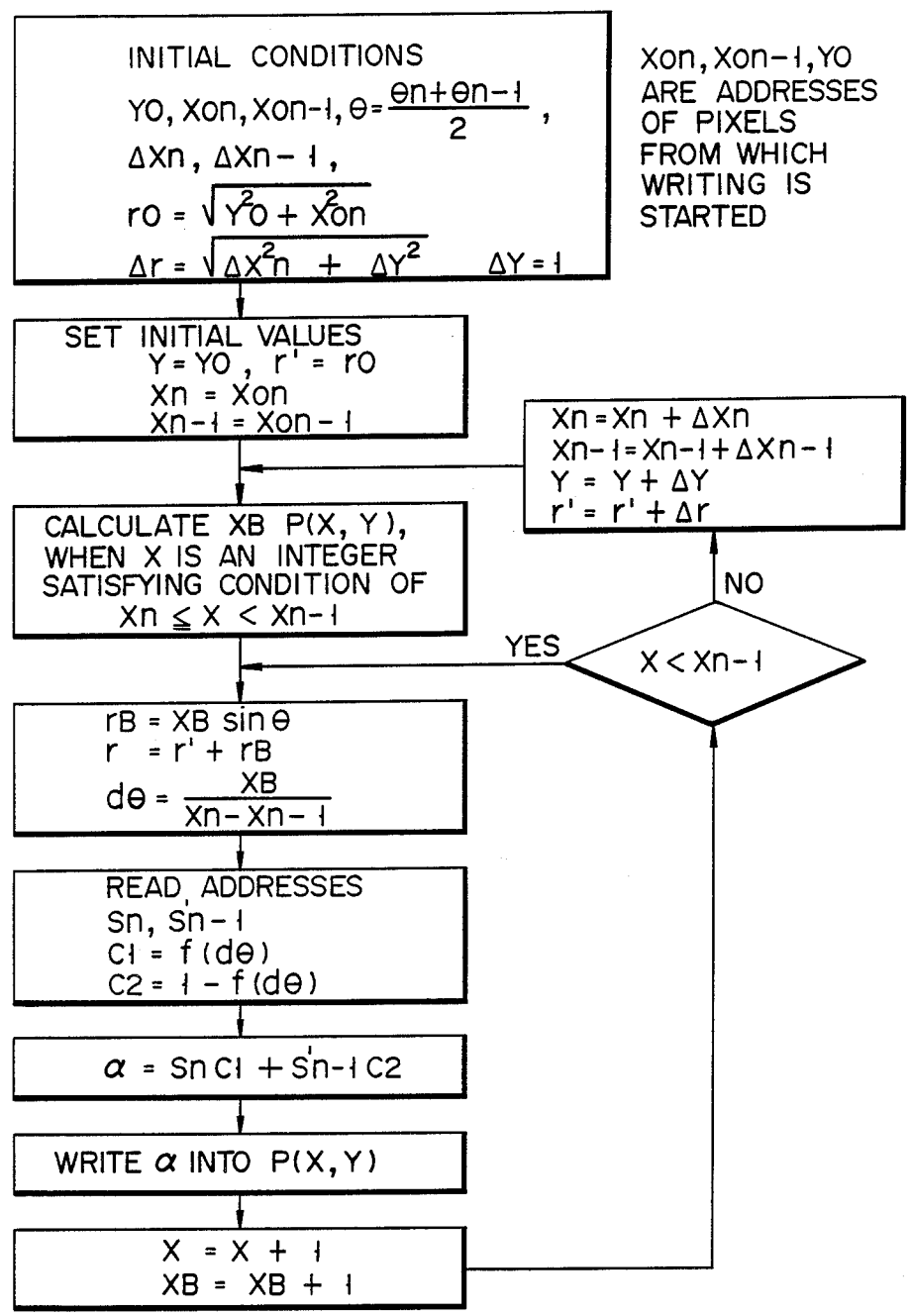
FIG. 5 is a flow chart showing the process of obtaining interpolation data.
Figure 6:
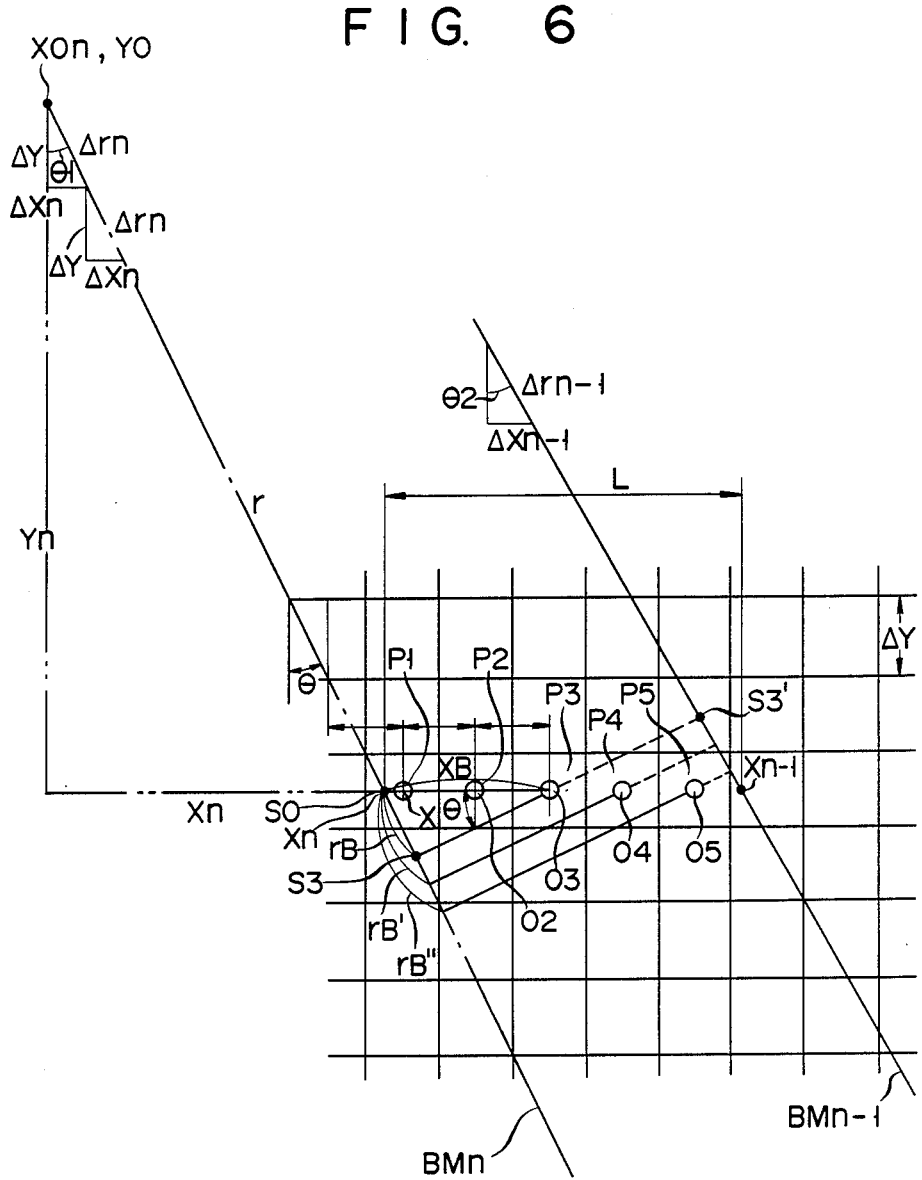
FIG. 6 is a diagram explaining the interpolation of image data.

Referring now to FIGS. 5 and 6, it will be explained how data-interpolation is performed in the invention. Initial coordinates are Y0, Xon, Xon−1, and $\theta = (\theta n + \theta n - 1)/2$, $\Delta Xn$, $\Delta Xn - 1$, $r0 = \sqrt{Y^2 + X^2 on}$, and $\Delta r = \sqrt{\Delta X^2 n + \Delta Y^2}$. Initial values are set as Y=Y0, r′ 32 r0, Xn=Xon and Xn−1=Xon−1. When ultrasonic beams $BM_n$ and $BM_{n-1}$ are inclined at angle $\theta 1 = \theta n$ and $\theta 2 (= \theta n - 1)$ to a subject, $\Delta Xn$, $\Delta X_{n-1}$, $\Delta r_n$, and $\Delta r_{n-1}$ will be given as follows:

$$\Delta X_n = \Delta Y \tan \theta 1 \quad (1)$$

$$\Delta r_n = \Delta Y / \cos \theta 1 \quad (2)$$

$$\Delta X_{n-1} = \Delta Y \tan \theta 2 \quad (3)$$

$$\Delta r_{n-1} = \Delta Y / \cos \theta 2 \quad (4)$$

where Y is the pitch of the pixels forming a tomogram.

$X_n$'s are accumulated, thereby obtaining value $X_n$. $\Delta r_n$'s are also accumulated, thus providing value r. $X_n$ and Y determine the coordinates of sampling point S0. Beams BMn and BMn−1 are at distance L from each other. Pixel P (=P3) to be written in frame memory 14 has center 0 (=03). Another sampling point $S_n$ (=S3) is provided at the intersection of beam BMn and the line extending from center 03 crossing beam BMn at right angles. Distance $\gamma B$ between sampling points S0 and S3 is given:

$$\gamma B = XB \cdot \sin \theta \quad (5)$$

where $\theta = (\theta 1 + \theta 2)/2$, and Xb is the horizontal distance between sampling point S0 and center 03. Distance r is calculated by r′ + rB.

The position of sampling point S3 can be determined by adding r to rB. The position of another sampling point S′n−1 (=S3′) can be determined by the same process. Factor d$\theta$ is obtained from XB/(Xn−Xn−1). C1 and C2 are calculated from formula $C1 = f(d\theta)$ and formula $C2 = 1 - f(d\theta)$. An interpolation operation is performed on the data sampled at points S3, S3′, C1 and C2, thereby obtaining data $\alpha$ corresponding to pixel P3. This data $\alpha$ is written at center 03 of pixel P3. In other words, the data interpolation is performed along the arc shown in FIG. 2.

To store pixel data in the pixel memory elements between ultrasonic beams $BM_n$ and $BM_{n-1}$, the address of the memory element to be written next is calculated. That is, X and XB are updated by an increment of one (1) corresponding to one-pixel width. If X 21 $X_{n-1}$ is satisfied, new rB, i.e., rB′, is calculated.

The number of blank pixel data representing a row of pixels located between beams $BM_n$ and $BM_{n-1}$ is obtained by subtracting value $X_{n-1}$ from value $X_n$. The data sampled at point S0 is stored at the center of that memory element of memory 14 which is provided for pixel P1, whereas the data provided by the aforementioned interpolation is stored at the center of that memory element of frame memory 14 which is provided for pixel P2, as described above. XB is renewed by adding one (pixel width) to the address of center 02 of pixel P2. The process is repeated in a similar manner, thereby forming other blank pixels P3 to P5 of the same row, by using interpolation data. When all pixels of the same row extending in the X direction have been obtained, new initial addresses can be obtained as follows:

$$Y = Y + \Delta Y \Delta Y \quad (6)$$

$$X_n = X_n + \Delta X_n \quad (7)$$

$$_{n-1} = X_{n-1} + \Delta X_{n-1} \tag{8}$$

$$r' = r' + \Delta r \tag{9}$$

Data interpolation is then carried out for these new initial addresses. As a result, the interpolation data fills up the pixel memory elements between ultrasonic beams $BM_n$ and $BM_{n-1}$.

The ultrasonic imaging apparatus shown in FIG. 1 will now be described. Ultrasonic transducer 11 emits an ultrasonic beam intermittently, performing a sector scanning on a subject. The echo signals output by ultrasonic transducer 11 through the sector scanning of the subject are converted into digital image data by A/D converter 12. More specifically, the echo signals are sampled at intervals shorter than the pitch of pixels. The data produced by A/D converter 12 is stored in high-speed buffer memories 13A to 13N through switch SW1 as the subject is scanned along scanning lines A to N.

When clock pulse CK1 is input from clock generator 17 to Y-address counter 18 and to accumulator/adder circuits 19 and 20. Counter 18 designates a Y-address upon receipt of clock pulse CK1. Circuit 19 stores a unit address signal $X_n$, and circuit 20 stores a unit address signal $X_{n-1}$. When clock pulse CK1 is input to circuits 19 and 20, unit address signals $X_n$ and $X_{n-1}$ are renewed according to equations (6) and (7). Address $X_n$ corresponds to the address of sampling point S0, and address $X_{n-1}$ corresponds to the address of a sampling point on the same horizontal line as sampling point S0.

Clock pulse CK1 is also input to +1 counter 22, thereby clearing this counter. Counter 22 counts clock pulses CK2 output by clock generator 17 and outputs data +δ. Data+δ is input to adders 21 and 25. Adder 21 adds the integral portion of address $X_n$ to data +δ. Address $X_n$ is usually displaced a little from the center of the corresponding pixel, and is therefore represented by a fractional number. Hence, adder 21 obtains the sum of data +δ and the integral part of this number, thereby determining the address of the pixel. Adder 25 obtains XB which is the sum of data +δ and the difference between one (1) and the fractional part of said number. Addresses $X_n$ and $X_{n-1}$ designated by accumulator/adder circuits 19 and 20 are input to subtractor 23. Distance L is determined by the difference between addresses $X_n$ and $X_{n-1}$.

Data XB and data θ are input to XY-Rθ converter 26, which obtains value rB. Data rB is input to adder 28 and added to r. Value r is obtained by address accumulator/adder circuit 27 which accumulatively adds Δr's. The output data of adder 28, i.e., r+rB, represents the address corresponding to desired sampling point S3 and designates the addresses of buffer memories 13A to 13N. The sampled data, which is stored at the addresses designated by r+rB, is read out and input to filter circuits 15A to 15N through switch SW2. Data XB, data L and filter characteristic data have been written into each of filter circuits 15A to 15N. A filter factor is obtained from these pieces of data stored in each filter circuit. The ratio between two pieces of data sampled at sampling points S3 and S3' can be calculated from data XB and data L. This ratio determines the pixel data to be stored in that memory element of frame memory 14 which corresponds to center 03 of pixel P3.

Now that the filter factor and the data sampled at sampling points S3 and S3' have been input to multiplier 15-2 of each filter circuit, the pixel data showing pixel P3 can be obtained by a convolution operation. The pixel data thus obtained is input to frame memory 14 through adder 16. The pixel data is stored in that memory element of memory 14 which is designated by the X-address output by adder 21 and the Y-address output by Y-counter 18.

When the pixel data, which will be stored in that memory element of frame memory 14 which corresponds to center 03 of pixel P3, is obtained, +1 counter 22 counts one to increase its count value +δ, thereby renewing XB. New rB' is obtained from renewed XB anmd angle θ. Adder 28 generates address data r+rB', whereby buffer memories 13A to 13N are designated, and the pieces of data sampled at points S4 and S4' are read from buffer memories 13A to 13N. When these pieces of data are input to filter circuits 15A to 15N and a new filter factor is calculated by new XB, the pixel data to be stored in that memory element of frame memory 14 which corresponds to center 04 of pixel P4 is obtained. In the same process, the pixel data representing pixel P5 is obtained and stored in the that memory element of memory 14 which corresponds to center 05 of pixel P5.

Figure 7:
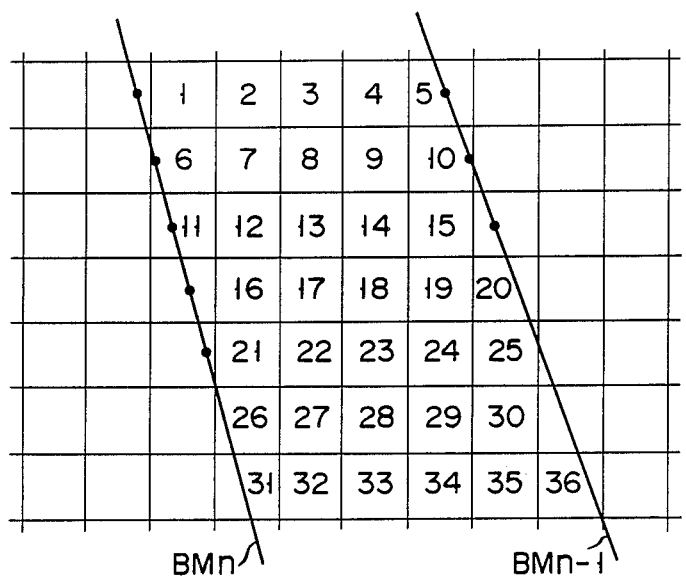
FIG. 7 shows interpolation data stored in a frame memory.

When the pixel data representing pixel P5 is stored in frame memory 14, the count +δ of +1 counter 22 is equal to L. Hence, comparator 24 supplies a clear signal to clock generator 17. Generator 17 is cleared and then starts supplying new clock pulses CK1 to Y-address counter 18, X-address (n) accumulator/adder 19 and X-address (n-1) accumulator/adder 2. Counter 18 renews the Y-address. Accumulator/adders 19 and 20 determine $X_n$ and $X_{n-1}$ for the renewed Y address. Then, the pixel data corresponding to another row of pixels is obtained by the above-mentioned sequence of operations which are performed on the renewed Y-address, $X_n$ and $X_{n-1}$. The pixel data is subsequently stored in memory 14. As a result, the pieces of data, 1–36 are written in the pixel memory elements between beams BMn and BMn−1 as shown in FIG. 7 and are sequentially stored in the corresponding memory elements of frame 14. In FIG. 7, the leftmost pixel data of the uppermost row is denoted by "1", the second leftmost pixel data of the same row is denoted by "2", and so forth, and rightmost pixel data of the lowest row is identified by "36." In practice, however, the pixel data which is first written in frame memory 14 is the data corresponding to beam-emitting point X0.

Figure 9A:
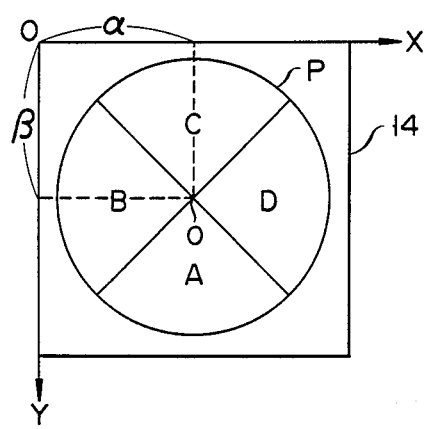
FIGS. 9A and 9B show radial scanning patterns explaining the operation of the apparatus shown in FIG. 8.

The embodiment described above forms a tomogram of the subject by means of sector scanning. Nonetheless, the present invention can be applied to an ultrasonic imaging apparatus which performs scanning on a subject. FIG. 8 is a block diagram showing this apparatus. In this apparatus, ultrasonic-transducer 11 (not shown in FIG. 8) is rotated through 360° round the subject. The apparatus forms a circular tomogram as is shown in FIG. 9A. Data is interpolated with respect to any adjacent two scanning lines. Data-sampling points along horizontal scanning lines are set apart for a long distance, and the precision of data-interpolation is inevitably low. Hence, the circular tomogram is divided into four sectors A to D, and the echo signals obtained by scanning that part of the patient's body which corresponds to each sector of the circular tomogram are processed in the same way as the echo signals produced by sector scanning. The addresses of frame memory 14 are designated such that the interpolation data obtained by this processing of echo signals is stored in those memory elements of frame memory 14 which correspond to the pixels forming said sector of the circular tomogram.

In the apparatus of FIG. 7, the echo signals which have been generated by radial scanning along the respective scanning lines and will be used to form the circular tomogram (FIG. 9A) are stored in high-speed buffer memories 13A to 13N. Addresses $X_n$ and $X_{n-1}$ for section A of the tomogram (FIG. 9A) are input to X-address accumulator/adder 19 and X-address accumulator/adder 20, respectively. As in the first embodiment (FIG. 1), accumulator/adders 19 and 20 output the X-addresses of the memory elements between the two adjacent ultrasonic beams, which are stored with interpolated pixel data. Adder 25 calclates data XB from the address data produced by accumulator/adders 19 and 20. Data XB and angle data $\theta$ are input to XY-R$\theta$ converter 26. Converter 26 obtains data rB and supplies this data to adder 28. Adder 28 outputs the readout address for rB+r. This address is supplied to buffer memories 13A to 13N, thereby designating the addresses of memories 13A to 13N. The sampled data are read from the designated addresses of memories 13A to 13N and input filter circuits 15A to 15N, and are subjected to a convolution operation in accordance with the filter factors. The output data of filter section 15 is written as pixel data into frame memory 14 though adder 16. The write-in addresses where the pixel data is written are designated by write-in address designating circuit 40.

Figure 10:
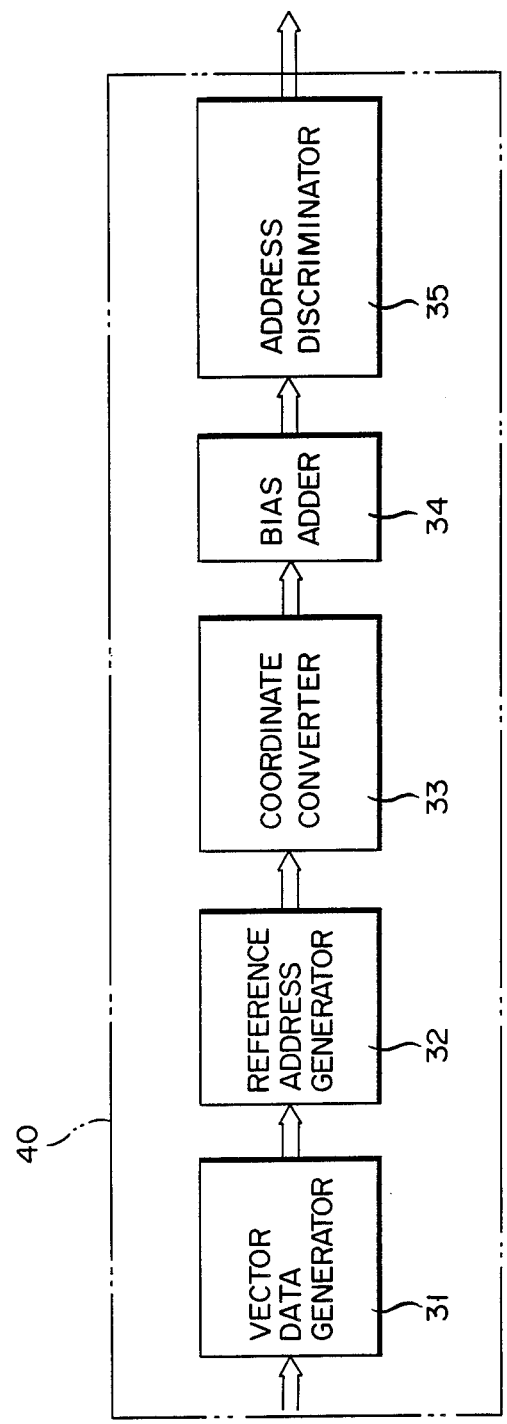
FIG. 10 is a block diagram of the write address designator shown in FIG. 8.

FIG. 10 is a block diagram of write-in address designating circuit 40. As shown in this figure, circuit 40 comprises vector data generator 31, reference address generator 32, coordinates converter 33, bias adder 34 and address discriminator 35. Vector data generator 31 receives the address data from Y-address counter 18 and and adder 21 and generates vector data XA and vector data YA showing the scanning lines of sector A. Reference address generator 32 accumulates vector data XA and vector data YA and generates the reference address of sector A.

Coordinates convertor 33 is used to alter the addresses of sectors B, C and D so that each of these sectors can be regarded as being rotated by 90° in the clockwise direction (FIG. 9A). To obtain interpolated pixel data for sectors B, C and D, the sampled data obtained from each of these sectors is processed in the same manner as the data obtained from sector A. However, when the interpolated pixel data is stored in frame memory 14, it must be stored in the memory position corresponding to each of sectors B, C and D. Their addresses are, therefore, altered.

Figure 9B:
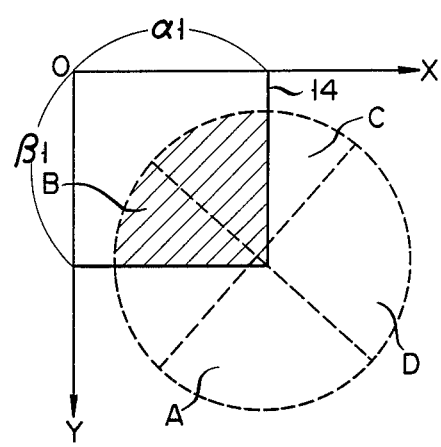

Bias adder 34 adds predetermined biases $\alpha$ and $\beta$ to the address of every sector of the circular tomogram in order to bring the center 0 of region P subjected to the radial scanning to the center address of frame memory 14. Address discriminator 35 determines whether or not the address obtained by bias adder 34 exists in frame memory 14. When address data designating any address of frame memory 14 is input to address discriminator 35, discriminator 35 determines that the data obtained by the radial scanning (FIG. 9A) can be stored in frame memory 14. When bias adder 34 adds biases $\alpha 1$ and $\beta 1$ to the addresses of sectors B, C and D, and outputs data designating an address which does not exists in frame memory 14, address discriminator 35 prohibits the writing of the data obtained by the radial scanning (FIG. 9B).

When the pixel data of section A is stored from the output filter section 15, into frame memory 14, coordinates converter 33 does not alter the address of sector A; it inputs to bias adder 34 the X-address and Y-address obtained by adder 21 and Y-address counter 18. Bias adder 34 adds bias $\alpha$ to address XA, and bias $\beta$ to address YA. When the address discriminator 35 determines that the address data output by bias adder 34 corresponds to any address in memory 14, the pixel data output by filter section 15 is stored at the designated address of memory 14.

When all pixel data of sector A and also the interpolation data provided by filter section 15 are stored in frame memory 14, the operation for storing the pixel data of sector B is started. Coordinates converter 33 alters the address of sector B. More precisely, the reference address supplied from reference address generator 32 is changed such that sector B can be regarded as being rotated by 90° in the clockwise direction. The pixel data of sector B is stored in the address of frame memory 14 which has been designated by this address alteration. Similarly, the pixel data of sector C and the pixel data of sector D are stored in frame memory 14. These pieces of pixel data are interpolation data to be stored in the memory elements between any two adjacent ultrasonic beams. Hence, frame memory 14 stores image data representing a tomogram formed of these pixels and the other pixels corresponding to the echo signals obtained by scanning the subject along every radial scanning line.

When readout addresses corresponding to the scanning lines of a monitor CRT (not shown) are input to frame memory 14, the image data is read from memory 14 and supplied to the monitor CRT. The monitor CRT displays the tomogram represented by this image data.

When the distance between any two adjacent ultrasonic beams increases due to zooming, a number of memory elements corresponding to the area between these beams must be stored by a number of pieces of pixel data, and therefore, more interpolation data must be provided. In this case, every other or every third pixel can be jumped, not to be written in frame memory 14. To achieve this jump interpolation, it suffices that +1 counter 22 outputs data $+\delta$ every time its count reaches two or three.

The data sampled along two adjacent beams are used in the data interpolation. A convolution operation can be performed to use the data sampled along three or more adjacent beams in the data interpolation.

As described above, echo signals are sampled at intervals shorter than the pitch of pixels. Therefore, pieces of pixel data can be correctly stored in the corresponding memory elements of frame memory 14. Further, since the data interpolation is accomplished by using the data sampled along two adjacent ultrasonic beams, the positions of the sampling points along one of the beams with respect to the beam-emitting point can be easily determined once the positions of the sampling points along the other beam have been determined. This saves time which can then be used to calculate the distances between all sampling points and the beam-emitting point.

What is claimed is:

1. An ultrasonic imaging apparatus comprising:
   ultrasonic transducer means for emitting an ultrasonic beam to a subject for sector-scanning or radial-scanning the subject and for converting echo waves reflected from said subject into echo signals;

image memory means for storing an array of a number of memory elements arranged in a predetermined pitch;

sampling means, coupled to said ultrasonic transducer means, for sampling the echo signals at intervals shorter than the pitch of the memory elements and for outputting a plurality of sampled data;

buffer memory means, coupled to said sampling means, for storing the sampled data output by said sampling means and corresponding to a plurality of scanning lines;

readout means, coupled to said buffer memory means, for reading at least two of the sampled data from said buffer memory means, said sampled data having been sampled at two points on two scanning lines, which are equidistant from a beam-emitting point where the ultrasonic beam is emitted; and interpolation means for providing interpolation data for interpolating between the at least two sampled data read by said readout means;

said image memory means comprising an array of the memory elements including rows and columns of memory elements for storing the interpolation data provided by said interpolation means between said scanning lines.

2. An ultrasonic imaging apparatus according to claim 1, wherein said buffer memory means comprises a plurality of buffer memories provided in correspondence with a plurality of scanning lines, for storing sampled data corresponding to the scanning lines, respectively.

3. An ultrasonic imaging apparatus according to claim 2, wherein said buffer memories are arranged in parallel.

4. An ultrasonic imaging apparatus according to claim 1, wherein said sampling means comprises an A/D converter for converting the echo signals into digital data at said intervals and supplying the digital data to said buffer memory means.

5. An ultrasonic imaging apparatus according to claim 1, wherein said readout means comprises means for calculating the ditance between any sampling point from the beam-emitting point, and supplying data representing this distance as address data to said buffer memory means.

6. An ultrasonic imaging apparatus according to claim 1, wherein said interpolation means comprises first calculation means for obtaining at least two filter factors from a rate of distance between one of the two sampling points and one interpolation data bit in respect to a distance between the two sampling points, and second calculation means for performing a convolution operation on the filter factors obtained by the first calculation means and the sampled data obtained by said sampling means which corresponds to the two sampling points.

7. An ultrasonic imaging apparatus according to claim 1, wherein said image memory means comprises a frame memory for storing the sampled data and the interpolation data, and means for calculating a write address for writing the sampled data and the interpolation data into said frame memory.

8. An ultrasonic imaging apparatus according to claim 7, wherein said means for calculating a write address comprises means for calculating the coordinates of a sampling point, and means for calculating the write-in coordinates of the interpolation data from the coordinates of the sampling point and outputting the write-in coordinates as the address data.

9. An ultrasonic imaging apparatus comprising:

ultrasonic transducer means for emitting an ultrasonic beam to a subject for radial-scanning the subject and for converting echo waves reflected from said subject into echo signals;

image memory means having an array of a number of memory elements arranged in a predetermined pitch;

sampling means, coupled to said ultrasonic transducer means, for sampling the echo signals at intervals shorter than the predetermined pitch of the memory elements and for outputting a plurality of sampled data representing a plurality of sectors forming an image;

buffer memory means, coupled to said sampling means, for storing the sampled data output by said sampling means and corresponding to a plurality of scanning lines;

readout means, coupled to said buffer memory means, for reading at least two of the sampled data from said buffer memory means, said sampled data having been sampled at two points on two scanning lines of each of the sectors, which are equidistant from a beam-emitting point where the ultrasonic beam is emitted;

interpolation means for providing interpolation data for interpolating between the at least two sampled data read by said readout means;

said array of memory elements including rows and columns of memory elements for storing the interpolation data between the scanning lines of each of the sectors; and address means for supplying address data to said image memory means to store the interpolation data for each of the sectors in the predetermined memory elements of said image memory means.

* * * * *